United States Patent [19]

Aoyama et al.

[11] Patent Number: 4,639,098
[45] Date of Patent: Jan. 27, 1987

[54] MICROSCOPE

[75] Inventors: Tsutomu Aoyama; Taizo Nakamura; Naoyosi Terao; Hirohiko Shinonaga, all of Kawasaki, Japan

[73] Assignee: Mitutoyo Mfg. Co., Ltd., Tokyo, Japan

[21] Appl. No.: 675,506

[22] Filed: Nov. 28, 1984

[30] Foreign Application Priority Data

Nov. 30, 1983 [JP] Japan .......................... 58-185311[U]
Dec. 28, 1983 [JP] Japan .......................... 58-203941[U]
Dec. 28, 1983 [JP] Japan .......................... 58-203942[U]

[51] Int. Cl.<sup>4</sup> ......................... G02B 21/20; G02B 7/16
[52] U.S. Cl. ..................................... 350/514; 350/520
[58] Field of Search ........................ 350/502, 511–517, 350/520, 257

[56] References Cited

U.S. PATENT DOCUMENTS

| | | | |
|---|---|---|---|
| 1,674,041 | 6/1928 | Henker | 350/254 |
| 2,720,138 | 10/1955 | Michel et al. | 350/520 |
| 2,901,943 | 9/1959 | Tackaberry | 350/516 |
| 2,910,913 | 11/1959 | Michel | 350/502 |
| 2,977,848 | 4/1961 | Malfeld | 350/520 |
| 3,471,220 | 10/1969 | Clark et al. | 350/520 |
| 3,682,069 | 8/1972 | Lecdeur | 350/257 |
| 3,941,452 | 3/1976 | Parker et al. | 350/513 |
| 4,518,230 | 5/1985 | Weber | 350/511 |

FOREIGN PATENT DOCUMENTS

| | | |
|---|---|---|
| 162850 | 4/1949 | Austria . |
| 0019666 | 10/1980 | European Pat. Off. . |
| 1400094 | 4/1965 | France . |
| 8100917 | 4/1981 | World Int. Prop O. . |
| 408162 | 4/1934 | United Kingdom . |
| 511828 | 8/1939 | United Kingdom . |
| 552623 | 4/1943 | United Kingdom . |
| 632466 | 11/1949 | United Kingdom . |
| 840177 | 7/1960 | United Kingdom . |
| 862734 | 3/1961 | United Kingdom ................. 350/502 |
| 1076080 | 7/1967 | United Kingdom . |
| 1102385 | 2/1968 | United Kingdom . |
| 1149833 | 4/1969 | United Kingdom . |
| 1196934 | 7/1970 | United Kingdom . |
| 1392446 | 4/1975 | United Kingdom ................. 350/514 |
| 2040065 | 8/1980 | United Kingdom . |

OTHER PUBLICATIONS

Heerbrugg, W., "Photomicrographic Equipments", Publication from Wild Heerbrugg Limited, Heerbrugg, Switzerland, pp. 1–8.

Primary Examiner—William H. Punter
Attorney, Agent, or Firm—Flynn, Thiel, Boutell & Tanis

[57] ABSTRACT

A microscope wherein a plurality of objective lens barrels (25) are mounted to a disk (23) in such a manner that the axial lines thereof are in parallel with the center axis of the disk (23), the disk (23) is rotatably provided on the undersurface of an upper frame (12A) of the main body (12) in such a manner that the axial line thereof is in parallel with the optical axis (18) of the main body, a large diameter screw (50) having a recess (50B) is affixed to the top surface of the upper frame (12A) a three lens barrel (13) is rested on this large diameter screw (50) and fixed to the large diameter screw (50) through a clamp member (14), and further, rectangular prisms (60) and a roof prism (74) for making it possible to visually observe a non-inverted image are provided in the three lens barrel (13).

12 Claims, 9 Drawing Figures

Prior Art

FIG. 1

Prior Art

FIG. 2

Prior Art

MICROSCOPE

BACKGROUND OF THE INVENTION

1. Field of the Invention

This invention relates to microscopes, and more particularly to improvements in portions including a construction of changing over objective lens barrels.

2. Description of the Prior Art

In these days of requiring accuracies in the order of microns, microscopes, particularly industrial microscopes, have been remarkably popularized in the various industrial fields, have come into wide use ranging from the surface inspection of metal structures to IC (integrated circuit) outer appearance inspection. Further, the shapes of articles to be inspected are widely varied.

In general, the microscope is constructed such that a plurality of objective lenses are changed from one over to another for observation, and the conventional objective lens change-over construction is of such an arrangement that an objective lens barrel in use is aligned with an inspection optical axis, other objective lens barrels in non-use are inclined to the inspection optical axis in a manner to escape from the inspection optical axis, and an axis of rotation of a rotary member secured thereto with a plurality of objective lenses described above is inclined to the inspection optical axis.

In consequence, other objective lens barrels in non-use are protruded either to a direction of an operator or a direction opposite thereto, whereby the barrels interfere with the operations, and moreover, necessitate a turning mechanism to be complicated and rugged, thus proving to be uneconomical.

Further, the conventional change-over construction has raised the following new problems with the increase in the scope of the articles to be tested. Namely, when an article and/or a jig for holding the article is of a shape being not flat and having irregularities thereon and a surface to be inspected is present in a recess of a product, there are many cases where the forward end of the barrel impinges on the article and the like in changing one objective lens barrel over to another. This is because the forward end of the barrel moves drawing a circular arc, and, during the change-over, the forward end of the barrel approaches a mount in accordance with the rotation thereof. On the other hand, it may be contrived that, in order to avoid this, in changing from one barrel over to another, the mount is temporarily lowered, and thereafter, raised again. However, such a method as described above is disadvantageous in that the efficiency of inspection is lowered to a considerable extent.

Now, in these days of requiring the functional expansion of the microscopes, the major theme of this functional expansion includes the visual inspection and the easy recording through the connection of a three lens barrel with a camera, a television camera, a projector or the like.

However, the conventional microscopes have been constructed such that the change in the combination between the major structural elements, such as the replacement of illumination systems, is made easy and major constructions are fixed to facilitates selection of an optimum system for each of the uses. As a result, there have been many cases where the proper characteristics of the microscopes are adversely affected along with the functional expansion described above.

Figure 1:
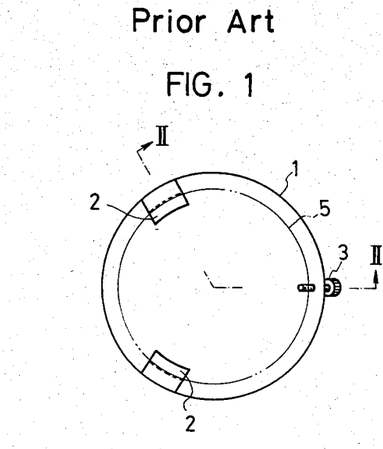
FIG. 1 is a plan view showing the outline of the conventional construction for mounting the three lens barrel.
Figure 2:
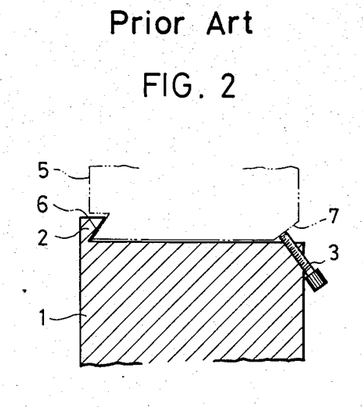
FIG. 2 is a sectional view taken along the line II—II in FIG. 1.

One of such cases as described above is the construction of a mounting for the three lens barrel to the main body of the microscope. More specifically, as shown in FIGS. 1 and 2, the conventional construction for mounting the three lens barrel is of such an arrangement that, by utilizing overhung portions 2 formed at two positions spaced 120° apart from each other on a main body 1 and a bolt 3 rotatably secured to a position spaced 120° apart from the two overhung portions 2 therebetween on the main body, a groove 6 provided on the three lens barrel is engaged with the overhung portions 2, and thereafter, by utilizing an inclined surface 7 provided on the three lens barrel 5, the three lens barrel is urged by the bolt 3 against the overhung portions 2, so that the three lens barrel can be fixed. The above-described construction, being a simplified one suitable only to the easy mounting and detaching, is disadvantageous in that the heavy weight of the three lens barrel 5 and a television camera or the like, which is mounted thereto, necessitates the mounting operation to be instable. Further, there is a possibility of the fall-down of the three lens barrel 5, and, it is difficult to maintain the accuracy of positioning of the main body 1 with the three lens barrel 5. Further, during inspection, there has been such a problem that a deflection of the head of the operator leads to a deflection or a shift in position of the three lens barrel 5.

Figure 3:
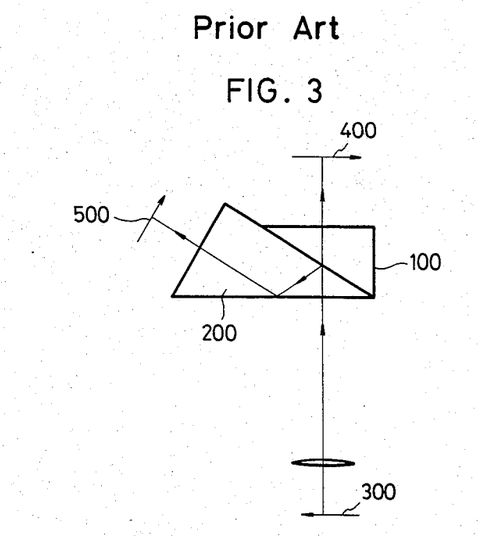
FIG. 3 is an explanatory view showing the prism arrangement in the conventional three lens barrels.

As shown in FIG. 3, prisms in the three lens barrel in the conventional ordinary microscope are formed of two 60°–30° rectangular prisms 100 and 200. With these rectangular prisms 100 and 200, an image of the article 300 to be inspected is separated into two images, including an image 400 of a set system, such as for a television camera and a photography camera and another image 500 of a visual system.

However, in the arrangement of the conventional prisms, not only the image 400 of the set system but also the image 500 of the visual system are inverted images, whereby the moving direction of the article 300, i.e. the table feeding direction is opposite to the moving direction in the visual image in the vertical direction, and, as the case may be, in the lateral direction, thereby adversely affecting the controllability. Particularly, in the IC outer surface inspection and the like, the shape, pattern and the like are repeated in four directions, whereby the trouble due to the difference from the feeding direction is significant, thus disadvantageously lowering the efficiency of inspection to a considerable extent.

SUMMARY OF THE INVENTION

A first object of the present invention is to provide a microscope wherein the efficiency of inspection is not lowered during the change-over operation of the objective lens barrels and the forward end of the lens barrel can avoid impinging on an article and the like.

To this end, the present invention contemplates that the objective lens barrels are mounted to a disk in a manner to be rotated about an optical axis of the main body, i.e. an axis being in parallel to an optical axis during inspection, whereby the respective objective lens barrels are rotated within a horizontal plane, so that interference with the article to be inspected can be avoided and necessity of the movement of a mount or the like in the vertical direction can be eliminated.

A second object of the present invention is to provide a mounting construction wherein the mounting or detaching the three lens barrel in the microscope is easily made and a deviation or a shift in position of the three lens barrel will not occur.

To this end, the present invention contemplates that, in mounting the three lens barrel to the main body, there are provided a position regulating plane in the axial direction of the main body and another position regulating plane in a direction perpendicularly intersecting the optical axis of the three lens barrel, which planes are associated with each other, a large diameter screw centered about the optical axis and incorporating therein the both position regulating planes is provided on either one of the main body and the three lens barrel, a clamp member having a screw associated with the large diameter screw is mounted to the other of the main body and the three lens barrel in a manner to be rotatable about the optical axis, and the main body and the three lens barrel are secured in position within one turn of the clamp member.

A third object of the present invention is to provide a microscope wherein a non-inverted visual image can be obtained, thereby facilitating the handling of the microscope.

To this end, the present invention contemplates that, in the three lens barrel, there is provided a rectangular prism for separating the optical axis of observation into two images, including a light path of a set system and another light path of a visual system, and a roof prism for a non-inverted image is provided in the rear of the light path of the visual system separated by the rectangular prisms.

DETAILED DESCRIPTION OF THE PREFERRED EMBODIMENT

Description will hereunder be given of one embodiment of the present invention with reference to the drawings.

Figure 4:
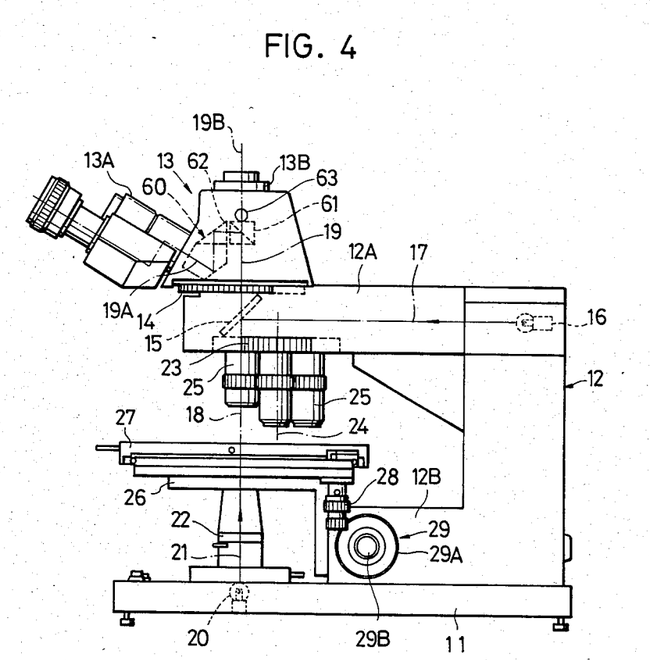
FIG. 4 is a general front view of one embodiment of the microscope according to the present invention.
Figure 5:
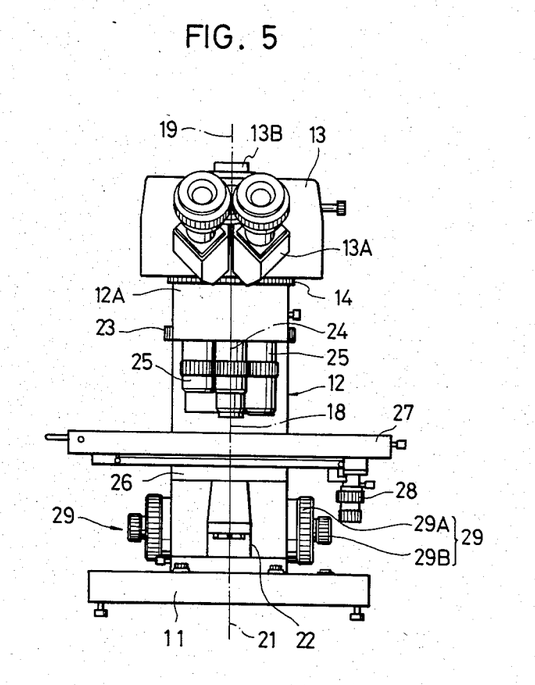
FIG. 5 is a side view thereof.

In FIGS. 4 and 5 showing the general arrangement, a three lens barrel 13 is detachably mounted through a clamp member 14 to the forward end of an upper frame 12A of a main body 12, being of a U-shape in side view, fixed onto a base plate 11, and this three lens barrel 13 is integrally provided with eye piece barrels 13A and a mechanical component barrel 13B for mounting thereon a photography camera, a television camera, a projector or the like. The outer peripheral edge of the clamp member 14 is raised to be exposed from the opposite side surfaces of the upper frame 12A, so as to be controlled from the outside of the upper frame 12A.

Mounted in the forward end portion of the upper frame 12A is a half mirror 15 at an angle of 45° to the vertical direction. A light 17 emitted from a light source 16 for a reflected light, which is provided in the proximal end of the upper frame 12A, is reflected and turned through 90° by the half mirror 15, and an optical axis, through which the reflected light passes, forms an optical axis of inspection, i.e. an optical axis 18 of the main body. This optical axis 18 of the main body is aligned with an optical axis 19 of observation to the eye piece barrels 13A and the mechanical component barrel 13B, and is also aligned with a light 21 emitted from a light source 20 for a transmitted light. In this case, the light 21 emitted from the light source 20 for a transmitted light is adjusted to a suitable quantity of light by an aperture 22.

The optical axis 19 of observation is separated by a prism mechanism 60 provided in the three lens barrel 13 into two paths, including an optical path 19A of a visual system extending to the eye piece barrels 13A and an optical path 19B extending to the mechanical component barrel 13B. Furthermore, the prism mechanism 60 includes a group of movable prisms 61 and a group of stationary prisms 62. The group of movable prisms 61 can change over spectral paths of the optical axis 19 of observation by a linear movement of a control shaft 63 protruded to the outside of the three lens barrel 13 in a direction perpendicularly intersecting the paper surface.

A disk 23 is rotatably supported on the undersurface at the forward end of the upper frame 12A. A rotary center axis 24 of this disk 23 is in parallel with the optical axis 18 of the main body. Furthermore, mounted to the disk 23 are a plurality of objective lens barrels 25, for example, four in the illustrated embodiment. These objective lens barrels 25 each have a central axes which are arranged on a hypothetical circle centered about the rotary center axis 24 of the disk 23 and which intersects the optical axis 18, and center axial lines (not shown to avoid complicated illustration) of the respective objective lens barrels are in parallel with the optical axis 18 of the main body, respectively. Further, at least portions of the peripheral surface of the disk 23 are raised to be exposed from the side surfaces of the upper frame 12A, so that the disk 23 can be rotated from the side surfaces of the main body 12.

An L-shaped frame 26 is vertically movably mounted to the forward end of a lower frame 12B of the main body 12. An X - Y table 27 as being a mount is provided on this L-shaped frame 26. Operation of a control grip unit 28 causes the top surface of the X - Y table 27 to move in the longitudinal and lateral directions. Furthermore, the L-shaped frame 26 is vertically driven by a control dial 29 including a rough control dial 29A and a fine control dial 29B, which are provided on the lower frame 12B. The vertical movement of the L-shaped frame 26 driven by the control dial 29 causes the article to be inspected, not shown, which is rested on the X - Y table 27 to be brought into a focal point of the objective lens barrel 25. In other words, a so-called focusing can be carried out.

Figure 6:
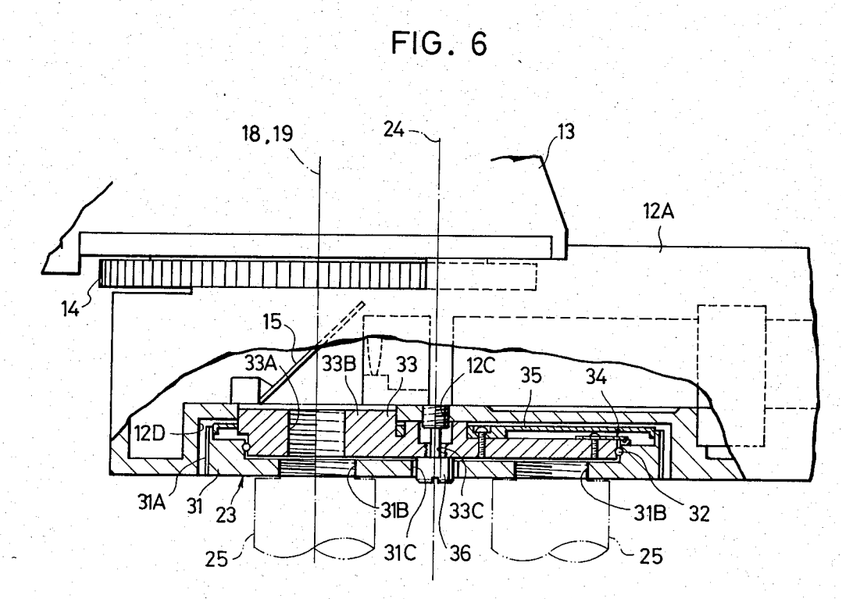
FIG. 6 is an enlarged sectional view showing the essential portions for mounting the objective lens barrels.

FIG. 6 shows the construction for mounting the disk 23 in detail. The disk 23 comprises: a disk body 31 provided at the peripheral surface thereof with an irregular surface 31A for finger grip and having a plurality of threaded holes 31B for receiving the objective lens barrels 25 and a screw insertion hole 31C at the center; an intermediate plate 33 rotatably support through a bearing 32 to the disk body 31 and is provided at the position of the optical axis 18 of the main body with a light path threaded hole 33A and a boss portion 33B and having a center threaded hole 33C at the center; a first click motion or detent motion arresting mechanism 34 provided between the disk body 31 and the intermediate plate 33, and including a leaf spring, a projection and a recess engageable with the projection, for positioning the respective objective lens barrels 25; a cover 35 secured to the intermediate plate 33, for covering the top surface of the intermediate plate 33 including the first click motion mechanism; and a fixing screw 36 inserted through the screw insertion hole 31C at the center of the disk body 31 and threadably coupled through the center threaded hole 33C of the intermediate plate 33 into a threaded hole 12C of the upper frame 12A so as to fix the intermediate plate 33 into a recess 12D of the upper frame 12A.

Figure 7:
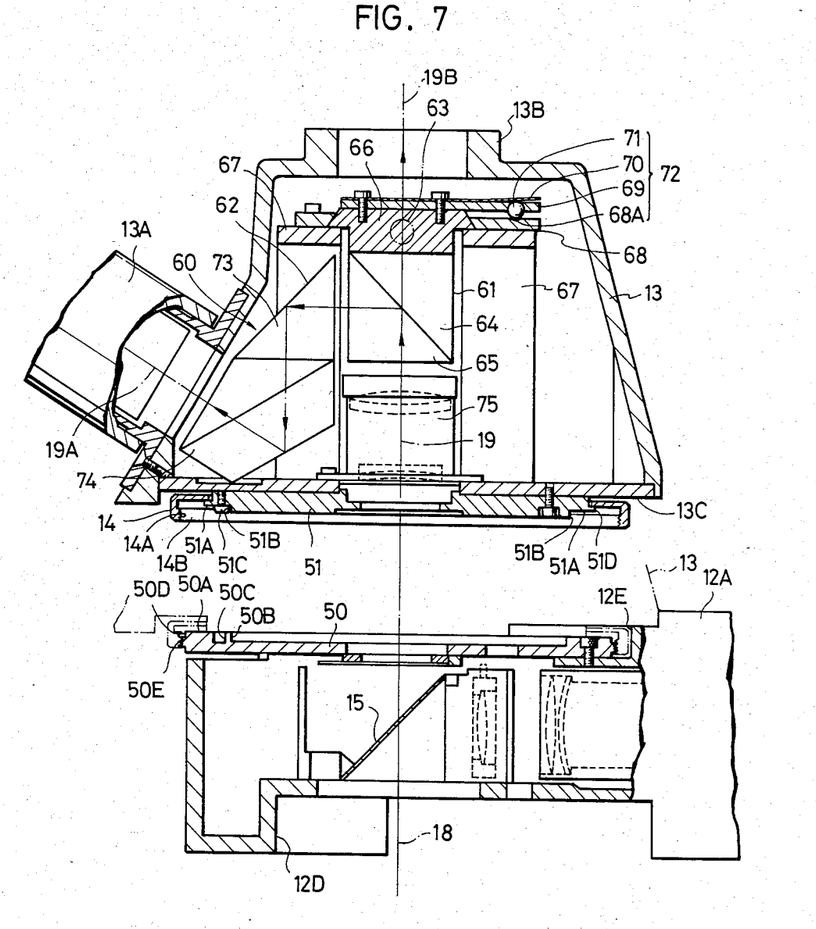
FIG. 7 is an enlarged sectional view showing the prism arrangement.

FIG. 7 shows the construction for mounting the three lens barrel 13 and the interior of the construction. Referring to the drawing, a large diameter screw 50 is threadably fixed into a recess 12E for mounting a three lens barrel, which is formed on the top surface at the forward end of the upper frame 12A. This large diameter screw 50 is fixed, being centered about the optical axis 18 of the main body, a center large diameter recess 50B is formed on a top surface 50A thereof, a recess 50C for locking the rotation is provided at a predetermined position outwardly of the center large diameter recess 50B, an outer diameter stepped portion 50D is formed on the top portion of the outer peripheral portion, and large diameter external threads 50E having a relatively large pitch is provided at the central portion of the outer periphery.

A mounting plate 51 is threadably fixed to a bottom plate 13C of the three lens barrel 13, and the clamp member 14 is rotatably engaged with an outer peripheral flange portion 51D. Large diameter internal threads 14A are formed on the inner surface of this clamp member 14. The large diameter internal threads 14A are adapted to be threadably coupled to the large diameter external threads 50E, and an inner peripheral surface 14B of the large diameter internal threads 14A and the outer diameter stepped portion 50D of the large diameter screw 50 constitute a position regulating plane in a direction perpendicularly intersecting the optical axis between the large diameter screw 50 and the mounting plate 51.

The mounting plate 51 is mounted, being centered about the optical axis 19 of observation, and a planar surface 51A is provided on the undersurface of a flange portion 51D of the mounting plate 51. Inwardly of this planar surface 51A, provided at a position opposed to the large diameter recess 50B of the large diameter screw 50 is a raised peripheral surface 51B, and a screw 51C for locking the rotation is fixed on the planar surface 51A, which is opposed to the recess 50C for locking the rotation of the large diameter screw 50. Here, the top surface 50A of the large diameter screw 50 and the planar surface 51A of the mounting plate 51 constitute a position regulating plane in the direction of the optical axis, the center large diameter recess 50B of the large diameter screw 50 and the raised peripheral surface 51B of the mounting plate 51 constitute a position regulating plane in a direction perpendicularly intersecting the optical axis, and further, the recess 50C for locking the rotation of the large diameter screw 50 and the screw 51C for locking the rotation of the mounting plate 51 constitute a position regulating plane in the circumferential direction.

Figure 8:
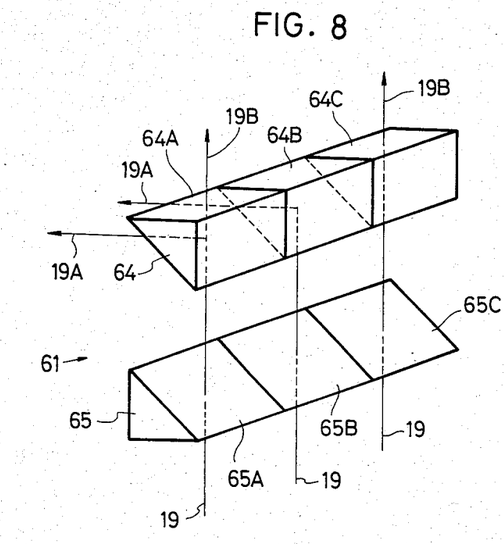
FIG. 8 is a disassembled perspective view showing the movable prism.

As shown in FIG. 8, a group of movable prisms 61 of the prism mechanism 60 are formed of triangular column-shaped upper and lower rectangular prisms 64 and 65, which are bonded together at their inclined surfaces. The upper rectangular prism 64 includes three unit prisms 64A, 64B and 64C, and the lower rectangular prism 65 also includes three unit prisms 65A, 65B and 65C. The unit prisms having reference characters corresponding to each other are adapted to be bonded together. A semitransparent film is deposited on an inclined surface of the unit prism 64A of the upper rectangular prism 64 to the left in FIG. 8, and, through the agency of this semitransparent film, a light from the optical axis 19 of obsevation can be separated into two paths, including an optical path 19A of a visual system and another optical path 19B of a set system. An entirely reflecting film is deposited on an inclined surface of the central unit prism 64B, and, through the action of this entirely reflecting film, a light from the optical path 19 of observation is entirely reflected to the optical path 19A of a visual system. No deposited film is formed on an inclined surface of the unit prism 64C to the right, whereby a light from the optical axis 19 of observation is entirely transmitted to the optical path 19B of a set system.

The group of movable prisms 61 are secured to a slider 66, which is slidably supported on a pair of gate-shaped support members 67 erected on the bottom plate 13C, and inclined surfaces at opposite sides of the top thereof is supported by a hold-down plate 68 forming a dovetail groove-shaped space in cooperation with the top surface of this support member 67, whereby the sliding movement thereof is smoothed and the locking thereof against dislodging is achieved. Furthermore, a steel ball support plate 69 and a leaf spring 70 are threadably fixed to the top surface of the slider 66, and a steel ball 71 is rotatably supported on the forward end of the steel ball support plate 69 in such a manner that the undersurface thereof is partially protruded out. This steel ball 71 is constantly pressed downwardly by the leaf spring 70, the protruding undersurface can be inserted into one of three recesses 68A formed on the top surface of the hold-down plate 68 at regular intervals to define a motion arresting device, and, the feeling of a click motion is obtainable through a fall-down of this steel ball 71 into one of the recesses 68A. Here, the steel ball support plate 69, the leaf spring 70, the steel ball 17 and the recess 68A constitute a second click motion or detent motion arresting mechanism 72, and the change-over operation of this click motion mechanism 72 is carried out by a control shaft 63 mounted to the slider 66, whereby the unit prisms 64A, 64B, 64C, 65A, 65B and 65C of the upper and the lower rectangular prisms 64 and 65 in the group of movable prisms 61 are changed over, and further, the light paths are changed over.

The group of stationary prisms 62 of the prism mechanism 60 includes a rectangular prism 73 opposed to the lower rectangular prism 65 in the group of movable prisms 61 and a roof prism 74 bonded to this rectangular prism, whereby the image 19A of the visual system, which is separated from the optical axis 19 of observation becomes a non-inverted image, i.e. be in the same directions as the article to be inspected both in the vertical and the lateral directions, so that the feed of the X - Y table 27 can be observed in such directions as they are. Furthermore, the group of stationary prisms 62 are fixedly supported between the inner walls of the support member 67.

Additionally, in FIG. 7, designated at 75 is a lens barrel provided in the optical axis 19 of observation in the three lens barrel.

In the above-described arrangement, in order to observe the article to be inspected, not shown, the control dial 29 should be operated to lower the X - Y table 27 by way of the L-shaped frame 26 so as to set the article on this X - Y table 27.

On the other hand, the objective lens barrel 25 having a magnification meeting the object is set at the position of the optical axis 18 of the main body by the rotation of the peripheral surface of the disk 23. Under this condition, the article is observed through the eye piece barrels 13A of the three lens barrel 13, the article is made to be distinctly observed by the adjustment of the rough control dial 29A and the fine control dial 29B of the control dial 29. In this case, either the light source 16 for the reflected light or the light source 20 for the transmitted light is previously turned on depending upon the characteristics of the article, and further, a suitable quantity of light is previously selected.

With the above-described arrangement, when the article can be distinctly observed, a predetermined observation is carried out. However, if the changeover of the magnification of the objective lens barrel 25 is desired, then the disk 23 is rotated again, whereby a predetermined objective lens barrel 25 is aligned with the position of the optical axis 18 of the main body. In turning this objective lens barrel 25, the undersurface of the objective lens barrel 25 is rotated in the horizontal direction, so that the respective objective lens barrels 25 will not abut against the article due to this turning. In this case, it is previously designed that the respective objective lens barrels 25 have their positions of distinct vision just on the article which is rested on the X - Y table 27 at the same time, so that the so-called "out of focus" due to the turning of the disk 23 will not occur.

In order to mount the three lens barrel 13 to the upper frame 12A of the main body 12, it is necessary that the three lens barrel 13 is grasped to oppose the clamp member 14 to the large diameter screw 50, and the raised peripheral surface 51B and the screw 51C for locking the rotation of the mounting plate 51 are engaged with the center large diameter recess 50B and the recess 50C for locking the rotation of the large diameter screw 50, respectively. If the clamp member 14 is rotated through one turn under this condition, then the large diameter internal threads 14A of the clamp member 14 is threadably coupled onto the large diameter external threads 50E of the large diameter screw 50, whereby the top surface 50A of the large diameter screw 50 is brought into contact with the planar surface 51A of the mounting plate 51, so that the main body 12 and the three lens barrel 13 can be firmly fixed to each other.

After the three lens barrel 13 is fixed to the main body 12 as described above, a camera, a television camera or the like is mounted to the mechanical component barrel 13B of the three lens barrel 13 as necessary, and the aforesaid observation is conducted. Furthermore, the unit prisms in the group of movable prisms 61 are changed over in accordance with the purpose of use of the microscope. More specifically, when the visual observation and the observation through the mechanical component are required, the unit prisms 64A and 65A to the left in FIG. 8 may be moved to be aligned with optical axis 19 of observation. When only the visual observation or the observation through the mechanical component is required, the unit prisms 64B and 65B at the center or the unit prisms 64C and 65C to the right may be moved to be aligned with the optical axis 19 of observation, respectively. Further, the inspection of the article may be conducted such that the disk 23 is rotated to select an objective lens barrel 25 having a magnification meeting the purpose, the article is rested on the top surface of the X - Y table 27, the control dial 29 is operated to move the X - Y table 27 through the L-shaped frame 26, the objective lens barrel 25 is brought to a focus, and the observation is made through the eye piece barrels 13A. In this case, the image of the visual system 19A through the eye piece barrels 13A can be observed an a non-inverted image due to the assembling-in of the roof prism 74.

According to this embodiment with the above-described arrangement, the change-over mechanism of the objective lens barrels 25 is formed by the disk 23 having the rotary center axis 24 being in parallel with the optical axis 18 of the main body, whereby the change-over operation of the objective lens barrels 25 is facilitated, no positional adjustment and the like of the X - Y table 27 is required at the time of the change-over operation and the efficiency of inspection will not be lowered. Furthermore, the operation of the disk 23 may be performed sideways from the main body 12, whereby the operation is facilitated. Moreover, the operation may be performed with the operator's eyes being kept upon the eye piece barrels 13A, whereby the efficiency of inspection will not be lowered from this respect too. Further, the turning of the objective lens barrel 25, is carried out, not by grasping the objective lens barrel 25, but by holding the disk 23, whereby there is no need of making firm the construction for mounting the objective lens barrels 25 as in the examples of the prior art, so that the construction may be rendered simplified and inexpensive. Furthermore, the respective objective lens barrels 25 are rotated in the horizontal direction as described above, whereby no interference with the article, i.e. the impingement thereupon is avoided and the article will not be damaged.

Furthermore, the prism mechanism 60 comprises a plurality of rectangular prisms 64, 65, 73 and a roof prism 74, so that the image of the visual system 19A can be observed as a non-inverted image and the direction of feeding the X - Y table 27 can be completely aligned with the moving direction of the image, thus enabling to improve the efficiency of inspection to a considerable extent. Furthermore, the non-inverted image is formed by means of the roof prism 74, so that the present invention can be worked without making the three lens barrel 13 large-sized so much. Additionally, the group of movable prisms are provided in such a manner that the light paths can be changed over, so that the inspection and the observation can be conducted by use of the optimum light path system as necessary. Further, the three lens barrel 13 can be rapidly mounted to the main body 12 at a stroke, the stability after the mounting is good, and the controllability is satisfactory. Furthermore, since the three lens barrel 13 is stably mounted to the main body 12, there are no such disadvantages that the three lens barrel 13 is shaken and the optical axis is shifted, thus enabling to improve the workability of the operations. Furthermore, when the three lens barrel 13 is rested in the recess 12E for mounting the three lens barrel of the main body 12, the movement in the diametrical direction is precluded through the agency of the center large diameter recess 50B and the raised peripheral surface 51B and the agency of the recess 50C for locking the rotation and the screw 51C for locking the rotation, thus effectively preventing the fall-off. Moreover, since the circular center align is adopted, an accurate positional relationship between the main body 12 and the three lens barrel 13 can be obtained. Further, since the large diameter screw 50 and the clamp member 14 are fixed to each other over the entire circumference, even if the pitch of threads is made relatively large, there is no problem about the stability of the fixation. In consequence, if the pitch of threads is made large, then the fixation between the large diameter screw 50 and the clamp member 14 can be made by the turning of the clamp member 14 only through an angle of several tens, thereby enabling to perform the mounting operation more rapidly. Even if an auxiliary component mounted to the mechanical component barrel 13B of the three lens barrel 13 is large-sized and the moment to the main body 12 is excessively large, the auxiliary component can be stably supported since the clamp member 14 and the large diameter screw 50 are fixed to each other over the entire circumference. In consequence, necessity of particularly designing an auxiliary component to be mounted to the three lens barrel 13 for the microscope is eliminated, a standard article in common use can be utilized.

Additionally, in the above embodiment, four objective lens barrels 25 have been described, however, the present invention need not necessarily be limited to this, and a plurality of objective lens barrels of three or less, or five or more, can be used. Furthermore, the construction for mounting the disk 23 to the main body 12 need not necessarily be limited to the one shown in the drawing, and any other one will do, only if the disk 23 is rotatably supported by the main body 12 and the rotary center axis 24 thereof is in parallel with the optical axis 18 of the main body. Further, the shape and construction of the main body 12 and the shapes and constructions of other members need not necessarily be limited to the above embodiment, and modifications within the scope of achieving the objects of the present invention should be included in the present invention.

Figure 9:
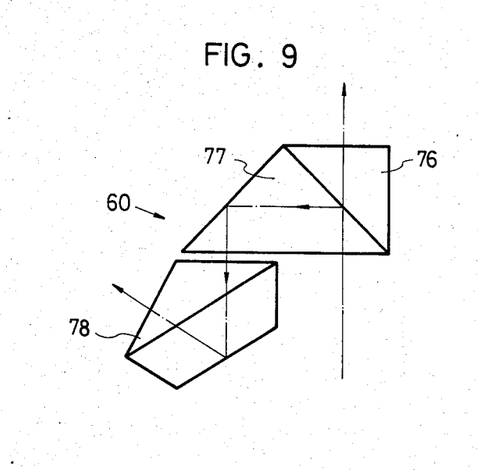
FIG. 9 is an explanatory view showing a modification of the prism arrangement other than the above.

As shown in FIG. 9, the prism mechanism 60 need not necessarily be limited to the above-described arrangement, combination of two rectangular prisms 76, 77 with the roof prism 78 may be adopted, and further, any other combination will do, only if it is an arrangement in which rectangular prisms and a roof prism are combined to form a non-inverted image in the light path of the visual system 19A.

Furthermore, the various position regulating planes need not necessarily be limited to the above-described constructions, and modifications within the scope of achieving the objects of the present invention should be included in the present invention. Further, the threaded portions of the clamp member 14 and the large diameter screw 50 may be increased not only in the pitch of threads but also in the number of threads. If multiple thread screws are adopted, then the quickness in the operation and the stability in the mounting can be further improved.

The present invention with the above-described arrangement can offer a microscope wherein the forward ends of the barrels are not abutted against the article to be inspected, the three lens barrel can be easily and reliably mounted to or detached from the main body, and a non-inverted visual image is obtainable.

What is claimed is:

1. A microscope, comprising:
   a main body having vertically spaced upper and lower frames horizontally elongated in parallel to each other;
   means defining a first optical axis on said upper frame;
   a disk and rotational support means for rotatably supporting said disk on an undersurface of said upper frame about an axis of rotation extending parallel to said first optical axis;
   plural objective lens barrels and mounting means for mounting said plural objective lens barrels to said disk, said lens barrels each having a second optical axis that extends parallel to said axis of rotation of said disk, said second optical axes each being arranged on a hypothetical circle on said disk that intersects said first optical axis;
   a detent motion arresting means circumferentially provided between said disk and said undersurface of said upper frame for arresting the motion of said disk at each location whereat one of said second optical axes becomes aligned with said first optical axis;
   an uprigtht barrel housing and large diameter thread detachable mounting means provided on an upper surface of said upper frame for facilitating a threaded attachment of said barrel housing to said upper frame, said barrel housing having first, second and third openings therein, said first and second openings being axially aligned and having a third optical axis coaxial with said first optical axis, said third opening having a fourth optical axis extending transversely to said third optical axis;
   prism means mounted in said barrel housing and in a pathway defined by said coaxial first and third optical axes, said prism means including movable and stationary prism means for separating from said first and third optical axes an image path which is coaxial with said fourth optical axis, said prism means also including first means for effecting said coaxial alignment of said image path with said third optical axis adjacent a lower end of said upright barrel means, and second means for providing a non-inverted image to said fourth optical axis; and
   mounting means on an upper end of said upright barrel means for facilitating a mounting of auxiliary optical recording apparatus having an input axis that is in coaxial alignment with said first optical axis.

2. A microscope as set forth in claim 1, wherein said disk is disposed in a direction perpendicularly intersecting first optical axis of said main body.

3. A microscope as set forth in claim 1, wherein:
   said disk includes a disk body having said mounting means thereon which comprise threaded holes for mounting said objective lens barrels and screww insertion hole and an intermediate plate and support means for facilitating a rotation of said disk body relative to said intermediate plate; and
   said disk body and said intermediate are mounted to said main body by a fixing screw threadably coupled through said screw insertion hole in said disk body and a center threaded hole in said intermediate plate.

4. A micorscope as set forth in claim 1, wherein there are provided a position regulating plane in a direction of said optical axis of a main body and another position regulating plane in a direction perpendicularly intersecting the optical axis of said three lens barrels, which planes are associated with each other; wherein said large diameter thread detachable mounting means includes a large diameter screw centered about said first optical axis and incorporating therein both said position regulating planes provided on either one of said main body and said barrel housing, and wherein a clamp member is provided having a screw associated with said large diameter screw mounted to the other of said main body and said barrel housing so that said large diameter screw is rotatable about said first optical axis, said main body and said barrel housing being secured in position within one turn of said clamp member.

5. A microscope as set forth in claim 4, wherein said large diameter screw is provided on said main body and said clamp member is provided on said barrel housing.

6. A microscope as set forth in claim 5, wherein said large diameter screw is threadably fixed to said main body in a direction perpendicularly intersecting said first optical axis and a recess, to which the bottom portion of said barrel housing is coupled, is provided on the top surface of said large diameter screw.

7. A microscope as set forth in claim 5, wherein a mounting plate to be mounted to said large diameter screw is provided on the bottom portion of said housing, and said clamp member is engaged with an outer peripheral portion of said mounting plate.

8. A microscope as set forth in claim 5, wherein said position regulating plane in said first direction of the optical axis is composed of a top surface of said large diameter screw and a planar portion of said mounting plate secured to the bottom portion of said barrel housing.

9. A microscope as set forth in claim 5, wherein said position regulating plane in a direction perpendicularly intersecting said first optical axis is composed of a recess formed in said large diameter screw and the peripheral surface of a mounting plate provided at the bottom portion of said barrel housing.

10. A microscope as set forth in claim 9, wherein a recess is formed on a top surface portion of said large diameter screw and a screw member to be inserted into said recess is formed in a bottom portion of said barrel housing, whereby the position regulation in the circumferential direction between said main body and lens barrel housing is conducted.

11. A microscope as set forth in claim 1, wherein said movable prism is supported by a slider movable in a direction perpendicularly intersecting said first optical axis in said barrel housing.

12. A microscope as set forth in claim 11, wherein said slider is regulated in position by a detent motion mechanism arresting means.

* * * * *

UNITED STATES PATENT AND TRADEMARK OFFICE
CERTIFICATE OF CORRECTION

PATENT NO. : 4 639 098

DATED : January 27, 1987

INVENTOR(S) : Tsutomu Aoyama et al

It is certified that error appears in the above-identified patent and that said Letters Patent is hereby corrected as shown below:

Column 10, line 47; change "third" to ---fourth---

Column 10, line 62; change "screww" to ---screw---

Column 12, line 1; after "said" insert ---barrel---

Column 12, line 5; change "said first direction of the" to ---the direction of said first---

Column 12, line 21; delete "lens"

Column 12, line 29; delete "mechanism"

Signed and Sealed this

First Day of September, 1987

Attest:

DONALD J. QUIGG

Attesting Officer     Commissioner of Patents and Trademarks